(12) United States Patent
Honda

(10) Patent No.: US 6,555,955 B1
(45) Date of Patent: *Apr. 29, 2003

(54) FRONT PANEL FOR DISPLAY

(75) Inventor: Satoshi Honda, Niihama (JP)

(73) Assignee: Sumitomo Chemical Company, Limited, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/360,636

(22) Filed: Jul. 26, 1999

(30) Foreign Application Priority Data

Jul. 28, 1998 (JP) .......................... 10-212590

(51) Int. Cl.$^7$ ................................ G02B 5/20
(52) U.S. Cl. ................ 313/489; 313/479; 359/559; 359/308; 348/835
(58) Field of Search ................ 313/581, 582, 313/479, 466, 489, 461; 359/559, 581, 614, 609, 308, 321; 348/835

(56) References Cited

U.S. PATENT DOCUMENTS

| | | | |
|---|---|---|---|
| 3,298,959 A | 1/1967 | Marks et al. | |
| 5,218,268 A | * 6/1993 | Matsuda et al. | ............. 313/479 |
| 5,315,209 A | * 5/1994 | Iwasaki | .................. 313/479 X |
| 5,645,461 A | 7/1997 | Iwasaki | |
| 5,961,893 A | * 10/1999 | Honda et al. | ........... 313/479 X |
| 5,973,448 A | * 10/1999 | Segner et al. | ........... 313/479 X |

FOREIGN PATENT DOCUMENTS

| | | |
|---|---|---|
| GB | 727140 | 3/1955 |
| JP | 5-27098 | 4/1993 |
| JP | 9-241520 | 9/1997 |
| JP | 10-128898 | 5/1998 |
| WO | WO 98/23980 | 6/1998 |

* cited by examiner

*Primary Examiner*—Ashok Patel
(74) *Attorney, Agent, or Firm*—Sughrue Mion, PLLC

(57) ABSTRACT

The present invention provides to a front panel for a display in which the light transmittance of the front panel at a wavelength of 450 nm is higher than the light transmittance at a wavelength of 525 nm and the light transmittance at the wavelength of 525 nm is higher than the light transmittance at a wavelength of 630 nm.

The front panel for a display of the present invention improves image contrast and color reproducibility of the display, when it is installed at the front side of a projection television receiver, a liquid crystal display, a plasma display, or the like.

19 Claims, 1 Drawing Sheet

FRONT PANEL FOR DISPLAY

BACKGROUND OF THE INVENTION

1. Field of the Invention

The present invention relates to a front panel for use in a projection television receiver, a liquid crystal display, a plasma display, or the like. More particularly, the present invention relates to a front panel for a display which improves image contrast and color reproducibility of the display, and a front panel for a display which improves image contrast and color reproducibility of the display and further have a property preventing the troubles resulting from a near-infrared ray or an electromagnetic wave emitted from the plasma display.

2. Description of Related Art

In recent years, an improvement of image contrast and the ability to reproduce color with fidelity have been required of various display devices with a view to improving image quality. In terms of improving image quality, it has been known that the absorption of external light and the reduction of reflection leads to improved image contrast. It has also been known that the absorption of visible light other than red, green and blue emission spectra from an image light source by a front panel for a display is effective in improving image quality. In the plasma display, orange light emission spectra is known to exist in the vicinity of a wavelength of 580 nm other than the red, green and blue emission spectra. This light emission spectra degrades image contrast and color reproducibility of the display. In the plasma display, color reproducibility is poor because the intensities of red, green and blue emission spectra of the display are different each other.

To solve these problems, Japanese Examined Patent Publication No. 5-27098 discloses a transmission screen device wherein a colorant which absorbs light in the wavelength range of 500 to 600 nm and a compound exhibiting spectral properties having a maximum transmittance in the vicinity of a wavelength of 520 nm are blended in a transmission screen. In Japanese Unexamined Patent Publications Nos. 9-241520 and 10-128898, there is also disclosed a resin composite panel having a property absorbing selectively light in a specified wavelength range. This panel composes of a transparent resin and at least one light absorbing compounds having an absorbance of 0.01 or more in a specified wavelength range and has a total light transmittance of 50 to 90% and spectral light transmittances in the visible light wavelength range of 430 to 650 nm, which are: 60 to 85% in the range of 430 to 480 nm; 50 to 70% in the range of 530 to 580 nm; and 50 to 85% in the range of 590 to 640 nm. Further, WO98/23980 discloses a bandpass filter having, as additives, a plurality of dyes for improving image contrast of a color display.

In accordance with the methods disclosed in Japanese Examined Patent Publication No. 5-27098 and Japanese Unexamined Patent Publication Nos. 9-241520 and 10-128898, the degree of absorbing visible light other than the red, green and blue emission spectra is low and the effect of reducing the reflection of ambient light and improving image contrast is unsatisfactory. Moreover, there is no description of wavelengths and transmittances in WO98/23980 and the effect of improving image contrast and color reproducibility is unsatisfactory because of a high transmittance in the vicinity of a wavelength of 580 nm. Furthermore, the intensities of red, green and blue emission of the display cannot be corrected by any of the foregoing methods and an improvement in color reproducibility of the display is unsatisfactory.

SUMMARY OF THE INVENTION

Accordingly, an object of the present invention is to provide a front panel for a display which improves image contrast and color reproducibility of the display.

Another object of the present invention is to provide a front panel which improves image contrast and color reproducibility of the display and further has a near-infrared-ray absorbing ability.

To attain such objects, the present inventors have found, after thorough study, that a front panel for a display which improves image contrast and color reproducibility of the display is obtainable by adding light absorbing compounds to the front panel and thereby adjusting the light transmittance of the front panel at a wavelength of 450 nm to be higher than the light transmittance at a wavelength of 525 nm and adjusting the light transmittance of the front panel at a wavelength of 525 nm to be higher than the light transmittance at a wavelength of 630 nm and that a front panel for a display which improves image contrast and color reproducibility of the display and further having a near-infrared-ray absorbing ability is obtainable by further adjusting the mean light transmittance at wavelengths of 850 nm to 950 nm to 15% or less, and accomplished the present invention.

The present invention is as follows:

(1) A display front panel, wherein the light transmittance of the front panel at a wavelength of 450 nm is higher than the light transmittance at a wavelength of 525 nm and the light transmittance of the front panel at the wavelength of 525 nm is higher than the light transmittance at a wavelength of 630 nm;

(2) A display front panel recited in the foregoing item (1), wherein the transmittance of the front panel with respect to light emitted from a display is higher than the total light transmittance of the front panel;

(3) A display front panel recited in the forgoing item (1) or (2), wherein the light transmittance of the front panel at the wavelength of 490 nm is 80% or less, the light transmittance of the front panel at a wavelength of 580 nm is 60% or less, the light transmittance at a wavelength of 670 nm is 80% or less, and the total light transmittance is 40% or more;

(4) A front panel for a display recited in any one of the forgoing items (1) to (3), wherein the light transmittance at the wavelength of 580 nm is 60% or less.

(5) A display front panel recited in any one of the forgoing items (1) to (4), wherein the mean light transmittance at a wavelength of 850 to 950 nm is 15% or less; and (6) A display front panel recited in any one of the forgoing items (1) to (5), wherein the front panel has at least one of a hardcoat layer, an electromagnetic-wave shielding layer, and an antireflection layer at a surface thereof or in the inside thereof.

BRIEF DESCRIPTION OF THE DRAWING

The FIGURE illustrates a display front panel assembly including a front panel in accordance with the present invention.

DETAILED DESCRIPTION OF THE INVENTION

Figure 1:
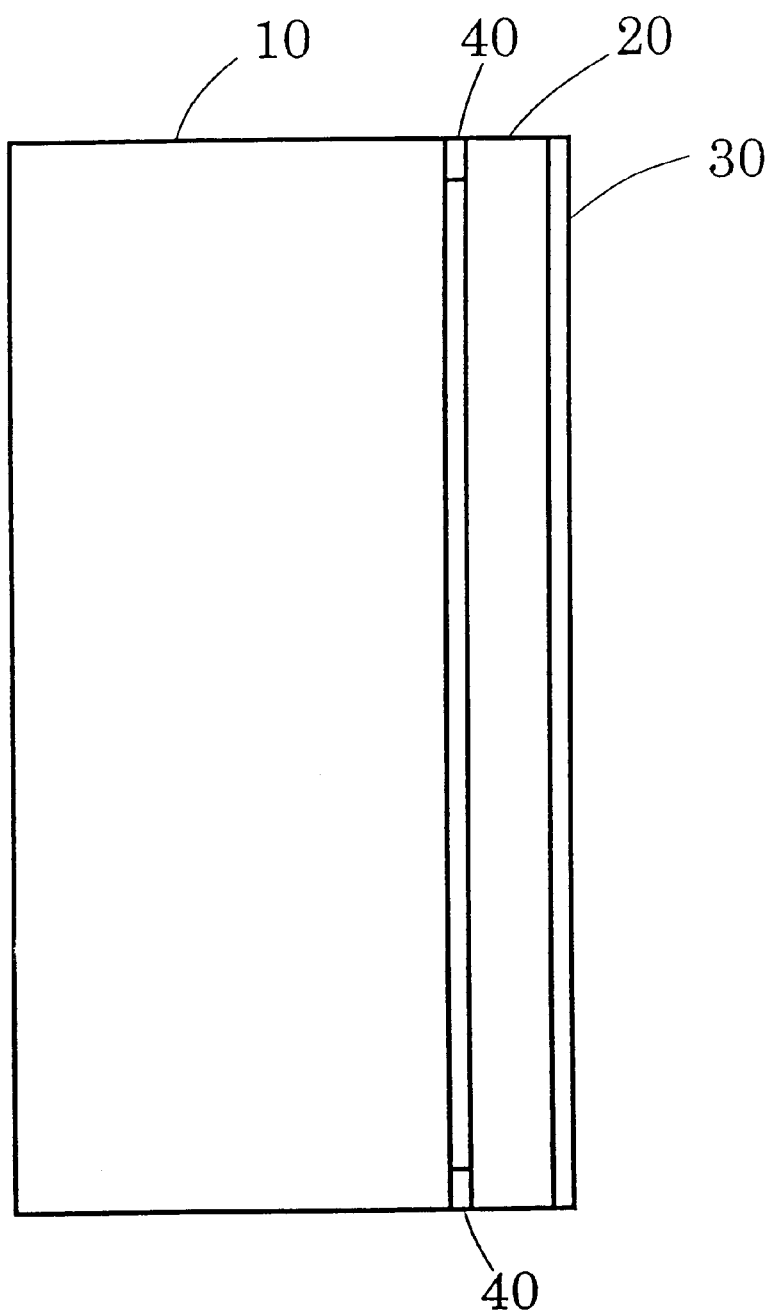

The present invention will be described in detail.

The front panel of the present invention is a film or sheet disposed at the front side of a display. The size of the front panel can be determined arbitrarily based on the screen size of the display device. The thickness of the front panel may also be determined arbitrarily but it is generally on the order of 0.01 to 10 mm.

The front panel is made of glass or a transparent resin. Examples of the transparent resin include an acrylic resin, a polycarbonate resin, a polyester resin, a cellulose resin such as triacetyl cellulose or diacetyl cellulose, or a styrene resin. Among them, an acrylic resin containing acrylic acid ester or methacrylic acid ester as the main component is particularly suitable in terms of light transmittance and weathering resistance. Likewise, an optical film or sheet provided with polarizing properties may also be used.

In the front panel according to the present invention, the light transmittance at the wavelength of 450 nm is higher than the light transmittance at the wavelength of 525 nm and the light transmittance at the wavelength of 525 nm is higher than the light transmittance at the wavelength of 630 nm. When the intensities of red, green and blue emission spectra are compared with each other in a display device, particularly in a plasma display, it is known that the intensity of the red emission is stronger than the intensity of the green emission and the intensity of the green emission is stronger than the intensity of the blue emission. By adjusting the light transmittance of the front panel to satisfy that the light transmittance at wavelength of 450 nm is higher than the light transmittance at wavelength of 525 nm and the light transmittance at wavelength of 525 nm is higher than the light transmittance at wavelength of 630 nm, the ratio between the intensities of red, green and blue emission is corrected so that color reproducibility is improved.

In particular, if the light transmittance of the front panel at the wavelength of 450 nm is assumed to be 1, the light transmittance at the wavelength of 525 nm is preferably in the range of 0.80 to 0.95 and the light transmittance at the wavelength of 630 nm is preferably in the range of 0.65 to 0.90 in terms of improving color reproducibility. In this case, the light transmittances at wavelengths of 450 nm, 525 nm, and 630 nm are preferably in close proximity to the reciprocal of the ratio between the intensities of blue, green and red light emission spectra of the display. If the ratio between the intensities of blue,.green and red emission of the display is, e.g., 1:1.2:1.3, the ratio between the light transmittances of the front panel at the wavelengths of 450 nm, 525 nm, and 630 nm is adjusted appropriately to the order of 1:0.83:0.77.

In order that the front panel of the present invention absorbs a maximum amount of external light, absorbs visible light other than red, green and blue emission spectra from an image light source, and thereby improves image contrast and color reproducibility of the display, the transmittance of the front panel with respect to light emitted from the display is preferably higher than the total light transmittance of the front panel and, more preferably, the transmittance of the front panel with respect to light emitted from the display is higher than the total light transmittance of the front panel by about 5% or more. The total light transmittance in this case is the total light transmittance of the front panel measured by the method described in JIS K-7361. The transmittance of the front panel with respect to light emitted from the display is calculated by the following equation based on respective luminances measured with and without the front panel attached the display when a white screen is shown on the display:

(Transmittance of Front Panel with Respect to Light Emitted from Display)=(Luminance with Front Panel/Luminance without Front Panel)×100.

Preferably, the front panel has a light transmittance of 80% or less at the wavelength of 490 nm, a light transmittance of 60% or less at the wavelength of 580 nm, a light transmittance of 80% or less at the wavelength of 670 nm, and a total light transmittance of 40% or more since the light other than light emitted from the display is absorbed efficiently and image contrast is improved. More preferably, the light transmittance at the wavelength of 490 nm is 70% or less and the light transmittance of 50% or less at the wavelength of 580 nm, the light transmittance at the wavelength of 670 nm is 70% or less. In the aforesaid case, further if the light transmittance at the wavelength of 580 nm is 60% or less and, more preferably, 55% or less, light emission in the vicinity of 580 nm which is unnecessary when the present front panel is used in the plasma display is absorbed and color reproducibility is improved.

To achieve the light transmittances in the front panel according to the present invention, a light absorbing compound is added. In the case where the light transmittance at wavelength of 450 nm is higher than the light transmittance at wavelength of 525 nm and the light transmittance at wavelength of 525 nm is higher than the light transmittance at wavelength of 630 nm) and preferably the light transmittance at the wavelength of 450 nm is assumed to be 1, if the light transmittance at the wavelength of 525 nm is to be adjusted to 0.80 to 0.95 and the light transmittance at the wavelength of 630 nm is to be adjusted to 0.65 to 0.90, the adjustments are accomplished by properly combining with each other a light absorbing compound having a maximum absorption wavelength in the range of 400 to 550 nm, a light absorbing compound having a maximum absorption wavelength in the range of 550 to 620 nm, and a light absorbing compound having a maximum absorption wavelength in the range of 620 to 900 nm.

As the light absorbing compounds, there can be used known dyes such as an anthraquinone compound, an azo compound, a phthalocyanine compound, a naphthalocyanine compound, a dithiol complex compound, and a cyanine compound.

To adjust the transmittance of the front panel with respect to light emitted from the display to be higher than the total light transmittance of the front panel, while holding the light transmittances at wavelengths of 450 nm, 525 nm, and 630 nm in the foregoing ranges, and adjust the light transmittance at the wavelength of 580 nm to 60% or less, the light transmittance at the wavelength of 490 nm to 80% or less, the light transmittance at the wavelength of 670 nm to 80% or less, and the total light transmittance to 50% or more, the proper light absorbing compounds are selected in consideration of the maximum absorption wavelengths and absorption widths of the light absorbing compounds. That is, the light transmittances at wavelengths of 490 nm, 580 nm, and 670 nm are selectively lowered by adding the selected ones of the light absorbing compounds having maximum absorption wavelengths in the vicinity of 490 nm, 580 nm, and 670 nm.

The following are examples of commercially available dyes as the light absorbing compounds. Examples of the compound having a maximum absorption wavelength in the range of 400 to 550 nm include: Sumiplast® Red 3B, Sumikaron® Red E-FBL, Sumikaron® Red S-GG, and Sumikaron® S-BWF, each of which is a dye commercially available from SUMITOMO CHEMICAL COMPANY, LIMITED; Diaresine® Red Z commercially available from MITSUBISHI CHEMICAL CORPORATION; Oleosol® Red BB commercially available from TAOKA CHEMICAL CO., LTD.; Cromophtal® Brown 5R commercially available from Chiba-Geigy Limited; and Paliogen® Red K-391HD commercially available from BASF Japan Ltd. Examples of the compound having a maximum absorption wavelength in the range of 550 to 600 nm include: Sumikaron® Bordeaux SE-BL, Sumikaron® Violet S-4RL, Sumikaron® Violet E-2RL, and Sumikaron® Blue S-3RF, each of which is commercially available from SUMITOMO CHEMICAL COMPANY, LIMITED; and NK4526 and NK4670 commercially available from Nippon Kanko Shikiso Kenkyusho Co., Ltd. Examples of the compound having a maximum absorption wavelength in the range of 600 to 900 nm include: Sumikaron® Turquoise Blue S-GL commercially available from SUMITOMO CHEMICAL COMPANY, LIMITED; IR-750 which is a dye commercially available from NIPPON KAYAKU CO., LTD.; SIR-114, SIR-159, PA-1005, and PA-1006, each of which is a near-infrared-ray absorbent commercially available from Mitsui Chemicals, Inc.; EX Color IR-1, IR-2, IR-3, VS-4, 601W, 803K, 604K, 802K, 803K, 805K, 808K, 901B, and 902B, each of which is a near-infrared-ray absorbent commercially available from NIPPON SHOKUBAI Co., LTD.; and NQM, IRF-700, IRF-770, and IRF-880, each of which is a near-infrared-ray absorbent commercially available from Fuji Photo Film Co., Ltd.

As the light absorbing compound having absorption in the vicinity of 580 nm which is required to adjust the light transmittance at the wavelength of 580 nm to 60% or less, a cyanine compound such as NK4526, NK4670, NK4675, NK2610, or NK4424 is particularly preferred, each of which is a dye commercially available from Nippon Kanko Shikiso Kenkyusho Co., Ltd.

The amount of each of the light absorbing compounds to be added is in the range of 0.0001 to 10 g per 1 $m^2$ of the front panel, though it varies depending on the light absorbing ability thereof. The amount of light absorbing compound to be added should be adjusted based on objective performance and on the thickness of the material of a final product. It is also possible to add a light absorbing compound having a maximum absorption wavelength other than the foregoing maximum absorption wavelengths as long as the accomplishment of the object is not affected thereby.

If the display to be used is a plasma display, it is known that a near-infrared ray emitted from the display causes trouble in various remote control devices. To absorb the near-infrared ray, the mean light transmittance at wavelengths 850 nm to 950 nm is preferably 15% or less. To achieve the mean light transmittance of 15% or less, there can be used, in addition to the foregoing compound having a maximum absorption wavelength in the range of 650 to 900 nm, an aluminum compound, an anthraquinone compound, a phthalocyanine compound, a naphthalocyanine compound, a dithiol complex compound, a polymethine compound, a pyrilium compound, a thiopyrilium compound, a squarylium compound, a chloconium compound, an azulenium compound, a tetrahydrocholine compound, a triphenylmethane compound, a diimmonium compound, or the like, each of which has absorption in the near-infrared region.

It is also possible to use a resin composition containing a phosphorus atom and a copper atom as disclosed in EP 0838475-A2. It is also possible to use a method in which a multilayer film containing silver is formed on the surface of a front panel.

As a method of producing the front panel according to the present invention by adding the light absorbing compounds to a film or sheet, there can be listed the following ones:

(1) A method of fusing and kneading the light absorbing compounds in the transparent resin and forming a film or sheet by a known method such as extrusion molding, injection molding, or press molding;

(2) A method of solving and dispersing the light absorbing compounds in a monomer component forming the raw material of the transparent resin, causing polymerization by a known cast polymerization method, and thereby producing a film or sheet;

(3) A method of forming a resin layer containing the light absorbing compound on a sheet or film by using a known coating method; and (4) A method of dyeing a film or sheet with the light absorbing compounds by a known dyeing method.

The front panel may be a single-layer film or sheet or a plurality of films or sheets stacked in layers. Alternatively, the front panel may also be produced by adhesively joining a film or sheet containing the light absorbing compounds obtained by the foregoing methods to glass, a film, or a sheet containing no light absorbing compound.

If necessary, it is also possible to add a light diffusing agent, a colorant, a reinforcing agent, a filler, a release agent, a stabilizer, a UV absorbent, an antioxidant, an antistatic agent, a flame-retardant, or the like to the front panel according to the present invention.

If necessary, a hardcoat layer, an electromagnetic-wave shielding layer, or and antireflection layer is formed on the surface of the front panel according to the present invention or in the inside thereof.

The surface of the transparent substrate, especially the surface thereof formed with the antireflection layer, is likely to be scratched when it is used. Therefore, the hardness of the surface is preferably increased by forming the hardcoat layer thereon. As the hardcoat layer, a known one used for the application is employed. For example, a cured film obtained by polymerizing and curing a coating agent containing a multifunctional monomer as the main component can be used. Specifically, there can be listed layers such as: a layer obtained by polymerizing and curing a multifunctional polymerizable compound containing two or more acryloyl or methacryloyl groups such as urethane (meth)acrylate, polyester (meth)acrylate, or polyether (meth)acrylate under the radiation of an activating energy beam such as a UV beam or an electron beam; and a layer obtained by thermally crosslinking and curing a silicon-based, melamine-based, or epoxy-based crosslinkable resin material.

To form the hardcoat layer, a coating agent is initially applied by a method used in a normal coating operation, such as spin coating, dip coating, roll coating, gravure coating, curtain flow coating, or bar coating. Subsequently, the coating agent is cured by a method in accordance with the raw material used. At this time, the coating agent may be diluted by various solvents to facilitate coating and adjusting the thickness of the coating film. The curing of the applied coating agent is performed by a method in which thermal polymerization is caused by elevating temperature with the application of heat or photopolymerization is caused by irradiation with an activating energy beam such as a UV beam or an electron beam.

The thickness of the hardcoat layer is not particularly limited but it is preferably 1 to 20 µm. If the thickness is smaller than 1 µm, a light interference pattern appears under the influence of the overlying antireflection layer, which is not preferred in terms of outward appearance. On the other hand, the film having a thickness over 20 µm is not preferred in terms of film strength because the coating incurs cracking or the like. To enhance adhesion between the transparent substrate and the hardcoat layer, an adhesive layer may be provided between the transparent substrate and the hardcoat layer. The adhesive layer may be a known one used for the application.

To shield an electromagnetic wave generated from the display, a conductive layer with enhanced electric conductivity is preferably provided on the front panel according to the present invention. As the conductive layer, there can be used a mesh made of a conductive fiber and a coating or multi-layer coating composed of a metal oxide such as zinc oxide, tin oxide and indium oxide, or metal such as gold, silver, copper and aluminum.

For improved visibility, the antireflection layer is preferably provided on either side of the transparent substrate of the front panel according to the present invention. As the antireflection layer, there can be used a multi-layer antireflection film obtained by combining a material having low refractive index such as magnesium fluoride or silicon oxide with a material having high refractive index such as titanium oxide, tantalum oxide, tin oxide, indium oxide, zirconium oxide, or zinc oxide or a single-layer antireflection film containing a fluorine-containing resin having low refractive index as the main component.

When used as the front panel for a projection television, a liquid crystal display, or a plasma display, the front panel according to the present invention improves image contrast and color reproducibility of the display. Moreover, when used as the front panel of the plasma display, the front panel according to the present invention absorbs unnecessary light emission in the vicinity of 580 nm particularly efficiently, so that the effect of improving image contrast is high.

A display front panel assembly including a front panel in accordance with the present invention is illustrated in the FIGURE. The assembly includes a display 10, front panel 20, hardcoat layer, electromagnetic-wave shielding layer or antireflective layer 30, and spacers 40.

EXAMPLES

The present invention will be described in detail with reference to the following examples.

The evaluation was conducted in accordance with the following methods.
(1) Total Light Transmittance Measurements were performed on the basis of JISK7361 by using the transmittance-reflectance meter HR-100 commercially available from Murakami Shikisai Kenkyusho.
(2) Transmittance of Front Panel with Respect to Light Emitted from Display A white screen was displayed on Plasma Display PDS-P1000 (without the front panel) commercially available from Fujitsu General Ltd. and respective luminances when the front panel was disposed and not disposed were measured by using the luminance meter PR650 commercially available from Photo Research Inc. so that the transmittance was calculated by using the following equation.

(Transmittance of Front Panel with Respect to Light Emitted from Display)=(Luminance with Front Panel/Luminance without Front Panel)×100

(3) Light Transmittance at Specified Wavelength

Measurements were performed by using Spectrophotometer U3410 commercially available from Hitachi, Ltd.
(4) Image Contrast and Color Reproducibility An image was displayed on Plasma Display PDS-P1000 (without the front panel) commercially available from Fujitsu General Ltd., which was observed by 10 viewers with an indoor fluorescent lamp being lit. The viewers were requested to judge whether or not they recognized the effect of improving image contrast and color reproducibility when the front panel was attached compared with the case where the front panel was not attached. The result was indicated by the number of viewers who judged that the improving effect was recognized.
(5) Remote Control Test Plasma Display PDS-P1000 commercially available from Fujitsu General Ltd., to which a front panel was attached was placed at a tilted angle of 15° to the plane perpendicular to the home TV, ahead of, and at a distance of 10 m from the TV, and the images were displayed thereon. Remote control signals (at a wavelength of 950 nm) were sent to the TV from a position at angle of 15° tilted in the direction opposite to the plasma display, ahead of, and at a distance of 3m from the TV to check if the TV would respond normally.

Then, the plasma display was brought close to the TV to measure the distance at which normal response disappeared. When the near-infrared rays produced from the display are not shielded, interference occurs in remote-control, leading to no response, or malfunctions. The shorter distance at which the normal response disappears is, the more excellent the remote-control interference preventing function is.

Example 1

After 0.00075 weight parts of Sumikaron® Violet S-4RL (maximum absorption wavelength: 550 nm), 0.0006 weight parts of Sumikaron® S-GG (maximum absorption wavelength: 500 nm), and 0.0006 weight parts of Sumikaron® Turquoise Blue S-GL (maximum absorption wavelength: 670 nm), each of which is a dye commercially available from SUMITOMO CHEMICAL COMPANY, LIMITED; and 0.1 weight parts of azobisisobutyronitrile as a radical polymerization initiator were dissolved in 100 weight parts of methyl methacrylate.

The resulting solution was injected into a polymerization cell consisting of a gasket made of polyvinyl chloride and two glass plates and subjected to thermal polymerization performed initially at 70° C. for 5 hours and then at 120° C. for 1 hour, whereby a plate with a thickness of 3 mm was obtained.

The plate obtained was used as the front panel without any alterations. The total light transmittance of the front panel was 67% and the transmittance of the front panel with respect to light emitted from the display was 75%. Light transmittances at individual wavelengths are shown in Table 1. If the transmittance at a wavelength of 450 nm is assumed to be 1, the transmittance at a wavelength of 525 nm is 0.94 and the transmittance at a wavelength of 630 nm is 0.89. The result of evaluating image contrast and color reproducibility is shown in Table 2.

Example 2

1.2 weight parts of copper hydroxide; 0.0005 weight parts of Sumikaron® S-GG (maximum absorption wavelength: 500 nm) which is a dye commercially available from SUMITOMO CHEMICAL COMPANY, LIMITED; 0.0005 weight parts of NK4526 (maximum absorption wavelength: 585 nm) which is a dye commercially available from Nippon Kanko Shikiso Kenkyusho Co., Ltd.; and 0.4 weight parts of t-butyl peroxy-2-ethylhexanoate as a radical polymerization initiator were solved in a monomer mixture composed of 74% by weight of methyl methacrylate, 4% by weight of methacrylic acid, 4% by weight of neopenthyl glycol dimethacrylate, and 18% by weight of a compound represented by the following chemical formula

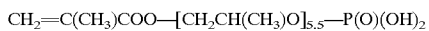

$$CH_2=C(CH_3)COO-[CH_2CH(CH_3)O]_{5.5}-P(O)(OH)_2$$

The resulting solution was injected into a polymerization cell consisting of a gasket made of polyvinyl chloride and two glass plates and subjected to thermal polymerization performed initially at 50° C. for 12 hours and then at 100° C. for 2 hours, whereby a plate with a thickness of 3 mm was obtained.

The plate was used as the front panel without any alterations. The total light transmittance of the front panel was 75% and the transmittance of the front panel with respect to light emitted from the display was 81%. Light transmittances at individual wavelengths are shown in Table 1. If the transmittance at a wavelength of 450 nm is assumed to be 1, the transmittance at a wavelength of 525 nm is 0.94 and the transmittance at a wavelength of 630 nm is 0.79. The result of evaluating image contrast and color reproducibility, and the result of evaluation in the remote control test are shown in Table 2.

Example 3

0.0005 weight parts of NK4526 (maximum absorption wavelength: 500 nm) which is a dye commercially available from Nippon Kanko Shikiso Kenkyusho Co., Ltd.; and 0.0025 weight parts of EX Color 901K (maximum absorption wavelength: 900 nm), 0.0075 weight parts of EX Color 902K (maximum absorption wavelength: 950 nm), 0.0025 weight parts of EX Color 805K (maximum absorption wavelength: 820 nm), each of which is a near-infrared-ray absorbent commercially available from NIPPON SHOKUBAI Co., LTD; and 0.1 weight parts of azobisisobutyronitrile as a radical polymerization initiator were dissolved in 100 weight parts of methyl methacrylate.

The resulting solution was injected into a polymerization cell consisting of a gasket made of polyvinyl chloride and two glass plates and subjected to thermal polymerization performed initially at 70° C. for 5 hours and then at 120° C. for 1 hour, whereby a plate with a thickness of 3 mm was obtained.

The plate was used as the front panel without any alterations. The total light transmittance was 50% and the transmittance of the front panel with respect to light emitted from the display was 56%. Light transmittances at individual wavelengths are shown in Table 1. If the transmittance at a wavelength of 450 nm is assumed to be 1, the transmittance at a wavelength of 525 nm is 0.87 and the transmittance at a wavelength of 630 nm is 0.79. The result of evaluating image contrast and color reproducibility, and the result of evaluation in the remote control test are shown in Table 2.

Comparative Example 1

A commercially available acrylic resin plate (methacrylic resin: Sumipex® 919 with a thickness of 2 mm commercially available from SUMITOMO CHEMICAL COMPANY, LIMITED). The total light transmittance was 73% and the transmittance of light emitted from the display was 65%. Light transmittances at individual wavelengths are shown in Table 1. If the transmittance at a wavelength of 450 nm is assumed to be 1, the transmittance at a wavelength of 525 nm is 1.08 and the transmittance at a wavelength of 630 nm is 1.18. The result of evaluating image contrast and color reproducibility, and the result of evaluation in the remote control test are shown in Table 2.

TABLE 1

| WAVELENGTH (nm) | LIGHT TRANSMITTANCE (%) | | | |
|---|---|---|---|---|
| | Example 1 | Example 2 | Example 3 | Comparative example 1 |
| 450 | 70 | 78 | 63 | 65 |
| 490 | 62 | 70 | 59 | 80 |
| 525 | 66 | 73 | 55 | 70 |
| 580 | 55 | 48 | 32 | 60 |
| 630 | 62 | 62 | 50 | 77 |
| 670 | 67 | 30 | 48 | 85 |
| MEAN VALUE AT 850–950 nm | 92 | 9 | 11 | 92 |

TABLE 2

| | Example 1 | Example 2 | Example 3 | Comparative example 1 |
|---|---|---|---|---|
| IMAGE CONTRAST (NUMBER OF VIEWERS) | 10 | 10 | 10 | 0 |
| COLOR REPRODUCIBILITY (NUMBER OF VIEWERS) | 10 | 10 | 10 | 0 |
| REMOTE CONTROL TEST (m) | 10 | 1 | 1 | 10 |

What is claimed is:

1. A front panel for a display, wherein a light transmittance of the front panel at a wavelength of 450 nm is higher than a light transmittance at a wavelength of 525 nm, the light transmittance at the wavelength of 525 nm is higher than a light transmittance at a wavelength of 630 nm and a light transmittance at a wavelength of 580 nm is 55% or less.

2. The front panel for a display according to claim 1, wherein when the light transmittance of the front panel at the wavelength of 450 nm is normalized to a value of 1, the light transmittance at the wavelength of 525 nm is in a range of 0.80 to 0.95 and the light transmittance at the wavelength of 630 nm is in a range of 0.65 to 0.90.

3. The front panel for a display according to claim 1 or 2, wherein a percent ratio of the light transmittance of the front panel to a light emittance of the display is higher than a total light transmittance of the front panel.

4. The front panel for a display according to claim 1 or 2, wherein a mean light transmittance at wavelengths of 850 to 950 nm is 15% or less.

5. The front panel for a display according to claims 1 to 2, wherein the front panel has at least one of a hardcoat layer, an electromagnetic-wave shielding layer, and an antireflection layer on a surface thereof or in the inside thereof.

6. The front panel for a display according to claim 1 or 2, wherein the display is a plasma display.

7. The front panel for a display according to claim 1 or 2, wherein a light transmittance at a wavelength of 490 nm is 80% or less, a light transmittance at a wavelength of 580 nm is 55% or less, a light transmittance at a wavelength of 670 nm is 80% or less, and a total light transmittance is 40% or more.

8. A front panel for a display, comprising a film or sheet disposed on a front side of the display, wherein a light transmittance of the front panel at a wavelength of 450 nm is higher than a light transmittance at a wavelength of 525 nm and a light transmittance at a wavelength of 525 nm is higher than a light transmittance at a wavelength of 630 nm.

9. The front panel according to claim 8, wherein, if the light transmittance of the front panel at the wavelength of 450 nm is normalized to a value of 1, the light transmittance at the wavelength of 525 nm is in a range of 0.80 to 0.95 and the light transmittance at the wavelength of 630 nm is in the range of 0.65 to 0.90.

10. The front panel according to claim 8 or 9, wherein a percent ratio of the light transmittance of the front panel to a light emittance of the display is higher than a total light transmittance of the front panel.

11. The front panel according to claim 8 or 9, wherein a mean light transmittance at wavelengths of 850 to 950 is 15% of less.

12. The front panel according to claim 8 or 9, further comprising at least one of a hardcoat layer, an electromagnetic wave shielding layer or an antireflective layer on a surface of the front panel or in the inside thereof.

13. The front panel according to claim 8 or 9, wherein the display is a plasma display.

14. A front panel for a display according to claim 8 or 9, wherein a light transmittance at a wavelength of 490 nm is 80% or less, a light transmittance at a wavelength of 580 nm is 55% or less, a light transmittance at a wavelength of 670 nm is 80% or less, and a total light transmittance is 40% or more.

15. The front panel according to claim 8, wherein the film or sheet comprises glass or a transparent resin.

16. The front panel according to claim 15, wherein the film or sheet comprises a transparent resin.

17. The front panel according to claim 16, wherein the transparent resin is a transparent resin selected from the group consisting of an acrylic resin, a polycarbonate resin, a polyester resin, a cellulose resin, and a styrene resin.

18. The front panel according to claim 17, wherein the transparent resin is a cellulose resin.

19. The front panel according to claim 18, wherein the cellulose resin is selected from the group consisting of triacetyl cellulose or diacetyl cellulose.

* * * * *